United States Patent [19]

Rogers et al.

[11] Patent Number: 4,965,145
[45] Date of Patent: Oct. 23, 1990

[54] ELECTRICAL STORAGE CELL RESISTANT TO FREEZING

[75] Inventors: Howard H. Rogers, Torrance; Steven J. Stadnick, Long Beach, both of Calif.

[73] Assignee: Hughes Aircraft Company, Los Angeles, Calif.

[21] Appl. No.: 388,230

[22] Filed: Aug. 1, 1989

[51] Int. Cl.⁵ .................. H01M 4/92; H01M 12/00
[52] U.S. Cl. ................................. 429/101; 429/44
[58] Field of Search ................................ 429/44, 101

[56] References Cited

U.S. PATENT DOCUMENTS

| | | | |
|---|---|---|---|
| 4,115,630 | 9/1978 | Ommering et al. | 429/101 |
| 4,327,158 | 4/1982 | Holleck | 429/101 |
| 4,585,711 | 4/1986 | Vaidyanathan | 429/44 |
| 4,683,178 | 7/1987 | Stadnick et al. | 429/101 |

Primary Examiner—Donald L. Walton
Attorney, Agent, or Firm—Steven M. Mitchell; Robert A. Westerlund; Wanda Denson-Low

[57] ABSTRACT

The conventional sintered, thin hydrogen negative electrode of a nickel-hydrogen storage cell or the like is replaced by a thicker porous electrode having a greater volume to receive water produced at the negative electrode during discharge of the cell. As a result, the dilution of the electrolyte within the negative electrode is less as compared with the thinner electrode, so that the freezing point depression of the electrolyte within the negative electrode is maintained. Freezing of the electrolyte and reduced performance of the cell are thereby avoided. To maintain the low weight of the electrode and reduce its cost even though its thickness is increased, platinum particles are replaced by conductive particles upon which platinum has been deposited.

16 Claims, 2 Drawing Sheets

ELECTRICAL STORAGE CELL RESISTANT TO FREEZING

BACKGROUND OF THE INVENTION

This invention relates to electrical storage cells, and, more particularly, to cells producing water during their chemical reactions, such as nickel-hydrogen cells.

Rechargeable cells or batteries are electrochemical devices for storing and retaining an electrical charge and later delivering that charge for useful power. Familiar examples of the rechargeable cell are the lead-acid cell used in automobiles, and the nickel-cadmium cell used in various portable electronic devices. Another type of cell having a greater storage capacity for its weight is the nickel oxide pressurized hydrogen cell, an important type of which is commonly called the nickel-hydrogen cell and is used in spacecraft applications. The weight of the spacecraft storage cell must be minimized while achieving the required performance level, due to the cost of lifting weight to earth orbit and beyond.

The nickel-hydrogen cell includes a series of active plate sets which store a charge electrochemically and later deliver that charge as a useful current, packaged within a pressure vessel that contains the plate sets and the hydrogen gas that is an essential active component of the cell. Each plate set includes a positive electrode, a negative electrode, and a separator between the two electrodes which is impregnated with an electrolyte. In a typical cell, about 40 plate sets are supported on a core under a light compressive loading, with a gas release screen between each plate set and with electrical connector leads extending to each electrode of each plate set. A nickel-hydrogen storage cell delivers current at about 1.3 volts, and a number of the cells are usually connected in series to produce current at the voltage required by the systems of the spacecraft.

A nickel-hydrogen cell used in a satellite is periodically charged by electrical current produced by solar panels on the spacecraft when the satellite is in sunlight, and then later discharged to supply electrical power, when the spacecraft is in shadow or peak electrical power is demanded. A satellite in a low earth orbit may experience up to about 6,000 cycles from light to dark conditions per year, with a corresponding number of cycles of charging and discharging the cells. A typical accepted industry design objective is attaining satisfactory operation through 30,000 cycles of charging and discharging, corresponding to an operating life of 5 years for the satellite in low earth orbit, or more years in other orbits where fewer battery cycles are experienced annually.

The electrolyte used in the cells is typically a 31% solution of potassium hydroxide solute in water, with a freezing point of about −65 C. Under conditions of simulated space operation of cells, freezing of a portion of the electrolyte has been observed at an operating temperature of about −15 C, above the normal freezing point of the electrolyte but within the expected range of spacecraft operations. The performance of the cells is adversely affected when the electrolyte freezes, and freezing cannot be tolerated. One solution to this problem is to limit the operating temperature range of the cells, but this solution would require a substantial increase in weight, because the temperature range is essentially governed by the space environment. Special insulation or heaters would be required to ensure the maintenance of an acceptable temperature, and these modifications would add weight and possibly consume energy, both of which are disadvantages.

There therefore exists a need for an approach that minimizes problems arising from the freezing of the electrolyte during electrical discharge of a storage cell of the nickel-hydrogen type, under ambient temperature conditions a few degrees above the nominal freezing point of the electrolyte. The present invention fulfills this need, and further provides related advantages.

SUMMARY OF THE INVENTION

The present invention provides a modified electrical storage cell construction for nickel-hydrogen and similar types of cells. The invention permits the use of the optimum electrolyte and yet avoids the freezing of the electrolyte during discharge, in ambient operating temperatures a few degrees above the freezing temperature of the electrolyte. That is, the electrolyte that is optimized for electrical performance is not changed in order to attain the improved low-temperature resistance to freezing of the cell. The operating performance of the cell is not adversely affected. The performance to weight ratio is thereby maintained, while the temperature range for operation is increased.

In accordance with the invention, an electrical storage cell that is resistant to freezing comprises storage means including a plurality of active plate sets, each plate set including a positive electrode, a porous hydrogen negative electrode, and a separator between the positive electrode and the negative electrode, the hydrogen negative electrode having a thickness of at least about 0.007 inches; and a pressure vessel that contains the plate sets.

The prior negative electrode of a nickel-hydrogen storage cell typically is an etched or mesh nickel substrate having a layer bonded thereto. The bonded layer is formed of platinum powder in a binder material such as polytetrafluoroethylene, trademark of E.I. Dupont deNemours Co. The total thickness of the negative electrode is made very thin to save weight. The substrate is about 0.003 inches thick and the layer of platinum in a binder is about 0.003 inches thick, for a total thickness of about 0.006 inches.

When the cell discharges during the discharge portion of its cycle, a chemical reaction occurs at the negative electrode. The half cell reaction at the negative electrode is represented by the expression:

$$H_2 + 2OH^- = 2H_2O + 2e^-$$

Water is produced at the negative electrode.

The present inventors have discovered that the water so produced tends to dilute the electrolyte in and immediately adjacent to the negative electrode. The electrolyte is a solution of a fixed amount of solute (typically a 31% concentration of potassium hydroxide) in water. As more water is added from the water produced at the negative electrode, the electrolyte becomes less concentrated in solute. (Thus, for example, the concentration of the electrolyte might be reduced from 31% solute to 20-25% solute.) The resulting diluted electrolyte has a higher freezing point than the undiluted electrolyte, due to the smaller freezing point depression of a less concentrated solute. Even though the amount of water produced at the negative electrode is relatively small, it can substantially dilute the electrolyte within and immediately adjacent to the electrode. This dilution is of particular concern when discharge is rapid, because there is insufficient time for the water produced to diffuse away into the bulk of the electrolyte, and when the operating temperature is only a few degrees above the nominal freezing point of the electrolyte.

As a result, even though the electrolyte having a nominal concentration of solute would not be expected to freeze at temperatures above the freezing point for that nominal concentration solution, the locally diluted electrolyte may be at a temperature below its freezing point and may freeze. The occurrence of that combination of conditions causes the observed freezing of conventional cells at operating temperatures of about $-15$ C.

The present invention provides for a thicker negative electrode that contains a greater volume of electrolyte. The amount of water added to the electrolyte by discharging is the same as in a conventional negative electrode, because the amount of water produced during discharge is controlled by the amount of electricity produced (number of electrons taken out of the cell during discharge). The dilution of the greater volume of electrolyte by a fixed amount of water is less for a thicker negative electrode than for a conventional thin negative electrode, so that the concentration of solute in the electrolyte remains closer to the nominal value in the cell having a thick negative electrode. The freezing point depression remains high, and the likelihood of freezing of the electrolyte at temperatures a few degrees above the freezing point is reduced.

The approach of using a thicker negative electrode can be practiced with an electrode of conventional construction having a mixture of platinum powders in a binder, bonded to a substrate. Such a thicker negative electrode is successful in avoiding freezing of the cell, but it also adds weight to the cell. A modified structure for the negative electrode has been developed that permits it to be prepared in a thicker form yet have a minimal increase in weight.

More specifically in respect to this aspect of the invention, an electrical storage cell that is resistant to freezing comprises storage means including a plurality of active plate sets, each plate set including a nickel positive electrode, a porous hydrogen negative electrode, and a separator between the positive electrode and the negative electrode, wherein the negative electrode has a thickness of at least 0.007 inches and wherein the negative electrode comprises a sintered nickel substrate, and a layer of a mixture of platinum deposited upon electrically conductive powders in a binder that is bonded to the substrate; a core upon which the plate sets are supported; and a pressure vessel that contains the plate sets and the core.

The layer of a mixture of platinum deposited upon electrically conductive powders in a binder replaces the layer of platinum powders in a binder, used in prior cells. The electrically conductive powders are selected to have a lower density than platinum, reducing the weight of the negative electrode while maintaining the level of platinum in the electrode. The powders become something of a filler, although they are not inert in that they must conduct electricity. Carbon or nickel powders, or a mixture of the two types, are preferred. The platinum is deposited upon the surface of the powder particles, conserving the amount of platinum that is used and lowering the density and cost of the electrode. The binder is preferably polytetrafluoroethylene, known as TEFLON.

The invention also extends to an individual plate set that is used within the cell. In this aspect, a porous hydrogen negative electrode for use in a storage cell comprises a layer of platinum deposited upon electrically conductive powders in a binder, the thickness of the layer being at least about 0.007 inches.

The present electrode design permits the storage cell to operate at temperatures below those of prior approaches, without reduced performance and with little or no increase in the weight of the cell components. Other features and advantages of the invention will be apparent from the following more detailed description, taken in conjunction with the accompanying drawings, which illustrate, by way of example, the principles of the invention.

DETAILED DESCRIPTION OF THE INVENTION

Figure 1:
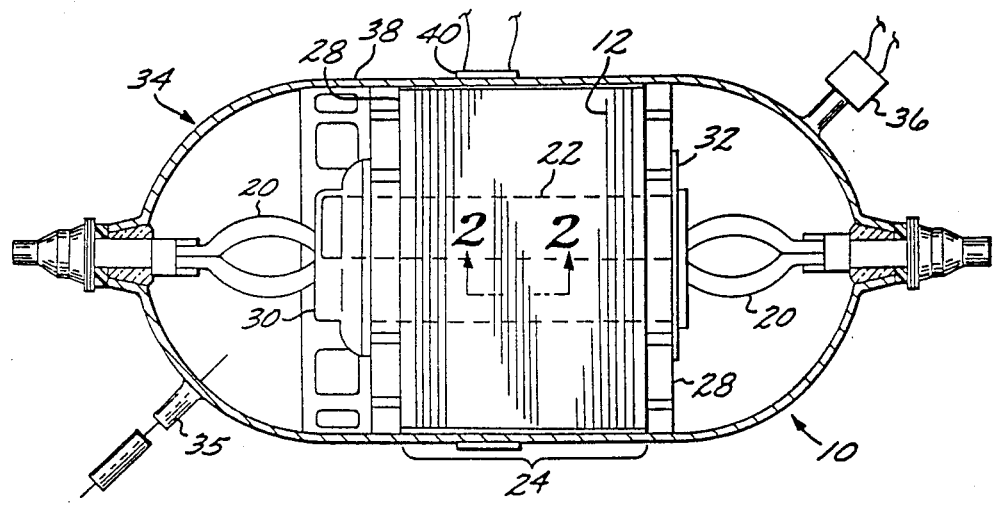
FIG. 1 is a sectional elevational view of a flight-type nickel-hydrogen cell.
Figure 2:
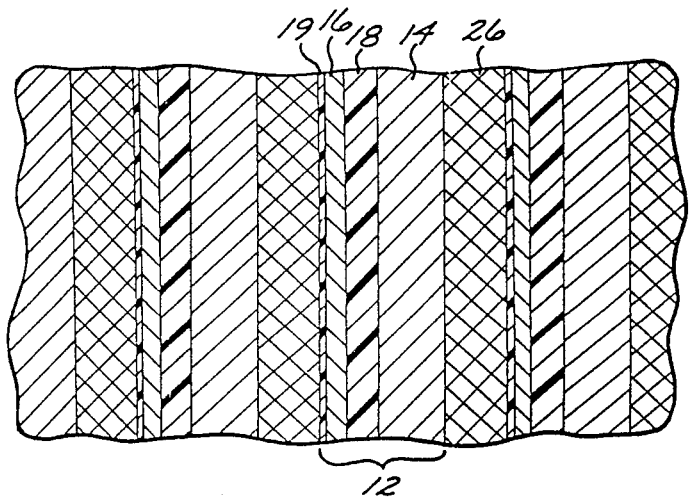
FIG. 2 is an enlarged sectional view of a detail of FIG. 1, taken generally on line 2—2, illustrating the plate sets.

The present invention relates to a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an cathode or positive electrode 14, a anode or negative electrode 16, and an electrolyte-containing separator 18, which physically separates the electrodes 14 and 16, and also supplies the electrolyte medium through which ionic and electron transfer occur. Charging and discharging of the plate set 12 are accomplished through electrical leads 20.

Various constructions of nickel-hydrogen cells and components are disclosed in the following U.S. Pat. Nos., whose disclosures are herein incorporated by reference: 4,683,178; 4,689,544; 4,283,844; 4,262,061; 4,250,235; 4,000,350; and 3,669,744.

The positive electrode 14 is formed by impregnating nickel hydroxide into porous sintered nickel that is supported on a nickel screen electrode substrate, and is about 0.030 inches thick. The negative electrode 16 is coated on one side by a sintered mixture of platinum black deposited upon conductive particles in a polytetrafluoroethylene binder, to be discussed in greater detail below, and on the other side with a porous layer of polytetrafluoroethylene 19. These layers are applied to a nickel substrate in the form of etched sheet or a woven mesh, to form the negative electrode 16.

Many different types of separators 18 have been used, including, for example, asbestos, nylon, and a cloth of zirconium oxide-yttrium oxide. The electrolyte is impregnated into the separator 18 in this flight-type cell. The separator is typically about 0.012 inches thick.

The individual plate sets 12 are assembled onto a central core 22 to form a stacked array termed the plate stack 24. The core is typically polysulfone plastic. In forming the plate stack 24, a polypropylene screen 26 about 0.016 inch thick is placed between each plate set 12 so that oxygen liberated during overcharging at each positive electrode 14 can diffuse away from the electrode 14 and to the negative electrode 16 to combine with hydrogen.

Figure 3:
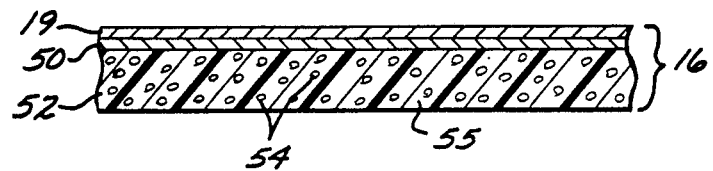
FIG. 3 is a further enlarged sectional view of a negative electrode.

FIG. 3 illustrates the negative electrode 16 in greater detail. The electrode 16 includes a substrate 50 that is formed from mesh or etched sheet. The preferred substrate is formed by etching 0.003 inch thick nickel sheet to have an array of square openings therethrough. The nickel material defining the opening has a width of about 0.0005 inches, and each opening is about 0.004 inches on a side.

One side of the electrode 16 is coated with porous polytetrafluoroethylene TEFLON to form a layer 19. The TEFLON is supplied in the form of a porous thin film of Gortex, and adhered to the electrode 16 with TEFLON 30, a 30% mixture of polytetrafluoroethylene in water with a small amount of a suspending agent such as Triton X100, available commercially from E.I. Dupont deNemours, Wilmington, Del. This mixture is applied to the surface of one side of the substrate with an air brush with an applied pressure of about 15 pounds per square inch. The thickness of the layer 19 is not critical, but should achieve a complete coverage, and is preferably on the order of about 0.001 inch. Typically, about four passes over the surface of the substrate are required. The TEFLON film is applied, and the substrate is dried and pressed between aluminum sheets at a pressure of 100 pounds per square inch for 30 seconds. The resulting layer 19 has the requisite porous TEFLON structure.

Figure 4:
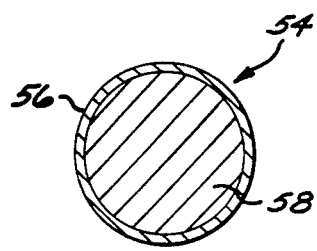
FIG. 4 is a further enlarged enlarged sectional view of a conductive particle having platinum coated thereupon.

On the other side of the substrate 50 is a layer 52 composed of a sintered mixture of particles 54 and polytetrafluoroethylene 55. One of the particles 54 is illustrated in FIG. 4. The particle 54 has a layer 56 of platinum coated upon an electrically conductive powder particle 58. The powder particle 58 is preferably pure carbon or pure nickel, of a diameter of 0.001 inches or less. It will be appreciated that most commercial powder products are available only in a mixture having powder particles of a range of sizes, and that such mixtures are acceptable in practicing the invention. The thickness of the platinum layer 56 is not critical, and may vary. Although in FIGS. 3 and 4 the layer 52 and the platinum layer 56 are illustrated as continuous for clarity in illustration, normally there is porosity in both the platinum layer 56 on the particle and the entire layer 52.

The layer 52 is a mixture of the particles 54 with the polytetrafluoroethylene binder. In a preferred approach, the mixture of particles and binder is prepared by mixing together at ambient temperature (1) 1.20 cubic centimeters of methocel, a 3.5% solution of methycellulose in water, available commercially from Dow Chemical Co., Midland, Mich., (2) 0.37 cubic centimeters of TFE 30, a 30% mixture of polytetrafluoroethylene in water with a small amount of a suspending agent such as Triton X100 available commercially from E.I. Dupont deNemours, Wilmington, Del., and (3) 4 grams of E137, a mixture of carbon particles having 3% by weight platinum coated thereon, mixed with 70.8% by weight water, available commercially from the Calsicat Division of Mallinckrodt Chemical Co. This mixture is a pastelike consistency at ambient temperature, and may be cooled in an ice bath if necessary to maintain this consistency.

The negative electrode 16 is formed by depositing a coating of the pastelike mixture onto the previously described substrate 50. The unsintered coating is preferably made at least 0.010 inches thick. The amount of coating that is applied to the substrate 50 is sufficient that, after sintering, the thickness of the layer 52 is from about 0.007 to about 0.014 inches, although thicker layers 52 are acceptable. For use in cells resistant to freezing, layers 52 thinner than about 0.007 inches are not acceptable, as the layer must be sufficiently thick to prevent dilution of the electrolyte contained therein during use. This minimum dimension is critical to the lowering of the freezing point of the negative electrode, particularly during rapid discharging when the operating temperature is only a few degrees above the freezing temperature of the electrolyte. In prior conventional practice, the layer of platinum particles in a binder was typically about 0.003 inches, and this thickness was simply not sufficient to prevent freezing. The thicker layer permits the water produced during discharge to mix with a relatively large volume of electrolyte, so that the electrolyte within the layer is not excessively diluted by the water.

The coated substrate is dried for at least 12 hours and sintered. Sintering is in air, with the following preferred sintering cycle: (1) heat gradually to 100 C. from ambient temperature in 30 minutes, (2) maintain at 100 C. for 1 hour, (3) heat gradually to 335 C. over 40 minutes, (4) maintain at 335 C. for 10 minutes, and (5) oven cool to ambient temperature. The electrode is trimmed to size and shape as necessary.

The negative electrodes 16 as just described are used in forming the plate sets 12 and plate stack 24 of the cell.

The plate stack 24 is initially placed under an externally induced longitudinal pressure of, for example, about 10 pounds per square inch, by tightening compression plates 28 against each end of the stacked array 24. The tightening of the compression plates 28 is preferably accomplished by compressing the stack 24 and then tightening a nut 30 on threads on the core 22, thereby compressing a Belleville washer set 32 against the compression plate 28 to hold the plate stack 24 in place.

The plate stack 24 is sealed within a pressure vessel 34, manufactured of a material such as Inconel 718 nickel-based alloy which can withstand internal pressures on the order of 1,000 psi, without damage by hydrogen embrittlement or corrosion by the electrolyte. A gas fill tube 35 allows gas content and pressure within the pressure 34 to be controlled, if necessary. The pressure vessel 34 is typically constructed in the form of a cylindrical tube having domed ends. By way of illustration, the cell 10 having the pressure vessel 34 of external dimensions 3-½ inches diameter and 13 inches long can contain about 40 individual plate sets 12, with a resulting electrical storage capacity of the cell of about 50 ampere-hours. The cell 10 may be charged and discharged through thousands of cycles without apparent physical damage to the components, if the charging and discharging are accomplished properly. A number of cells 10 are typically combined in series and parallel arrangements to produce a battery with the required voltage and current delivery characteristics.

The cell 10 is normally instrumented to monitor its operational state. As the nickel-hydrogen cell is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be deduced by measuring a quantity which responds to pressure, specifically the deformation in the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34.

Charging is accomplished by impressing a voltage through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cells and the cycle dictated by the orbit of the spacecraft.

The negative electrodes of the invention are less dense than the prior type of negative electrodes. As a result, a thicker electrode can be prepared having comparable weight with the prior art electrode. Although a particular embodiment of the invention has been described in detail for purposes of illustration, various modifications may be made without departing from the spirit and scope of the invention. Accordingly, the invention is not to be limited except as by the appended claims.

What is claimed is:

1. An electrical storage cell that is resistant to freezing, comprising:
    storage means including a plurality of active plate sets, each plate set including a positive electrode, a porous hydrogen negative electrode, and a separator between the positive electrode and the negative electrode, the hydrogen negative electrode comprising a substrate having a layer of a sintered mixture of electrically conductive particles and a binder thereon, the layer of the sintered mixture having a thickness of at least about 0.007 inches; and
    a pressure vessel that contains the plate sets.

2. The storage cell of claim 1, wherein the electrically conductive particles comprise platinum deposited upon electrically conductive powders.

3. The storage cell of claim 2, wherein the electrically conductive powders are selected from the group consisting of nickel, carbon, and mixtures thereof.

4. The storage cell of claim 1, wherein the negative electrode comprises:
    an etched nickel substrate, and
    a sintered mixture containing polytetrafluoroethy, and platinum-coated electrically conductive powder bonded to the substrate.

5. The storage cell of claim 4, wherein the electrically conductive powders are selected from the group consisting of nickel, carbon, and mixtures thereof.

6. The storage cell of claim 1, wherein the substrate of the negative electrode is nickel.

7. The storage cell of claim 1, wherein the binder of the negative electrode is polytetrafluoroethylene.

8. An electrical storage cell that is resistant to freezing, comprising:
    storage means including a plurality of active plate sets, each plate set including a nickel positive electrode, a porous hydrogen negative electrode, and a separator between the positive electrode and the negative electrode, wherein the negative electrode comprises a sintered nickel substrate, and a layer of a mixture of platinum deposited upon electrically conductive powders in a binder that is bonded to the substrate, the layer having a thickness of at least about 0.007 inches;
    a core upon which the plate sets are supported; and
    a pressure vessel that contains the plate sets and the core.

9. The storage cell of claim 8, wherein the electrically conductive powders are selected from the group consisting of nickel, carbon, and mixtures thereof.

10. The storage cell of claim 8, wherein the binder is polytetrafluoroethylene.

11. A porous hydrogen negative electrode for use in a storage cell, comprising:
    a layer of platinum coated electrically conductive powders supported by a binder, the thickness of the layer being at least about 0.007 inch; and
    a substrate upon which the layer is supported.

12. The electrode of claim 11, wherein the electrically conductive powders are selected from the group consisting of nickel, carbon, and mixtures thereof.

13. The electrode of claim 11, wherein the binder is polytetrafluoroethylene.

14. The electrode of claim 11, wherein the substrate is sintered nickel powder.

15. The electrode of claim 11, wherein the substrate is etched nickel sheet.

16. The electrode of claim 11, wherein the substrate is about 0.003 inches thick.

* * * * *